United States Patent
Lutz et al.

(10) Patent No.: US 9,707,657 B2
(45) Date of Patent: Jul. 18, 2017

(54) MACHINE TOOL

(71) Applicant: FFG WERKE GMBH, Mosbach (DE)

(72) Inventors: Frank Lutz, Offenburg (DE); Daniel Scholz, Friesenheim (DE); Armin Mueller, Gengenbach-Schwaibach (DE)

(73) Assignee: FFG WERKE GMBH, Mosbach (DE)

( * ) Notice: Subject to any disclaimer, the term of this patent is extended or adjusted under 35 U.S.C. 154(b) by 190 days.

(21) Appl. No.: 14/712,956

(22) Filed: May 15, 2015

(65) Prior Publication Data
US 2015/0328735 A1 Nov. 19, 2015

(30) Foreign Application Priority Data
May 16, 2014 (DE) .................. 10 2014 106 915

(51) Int. Cl.
*B23Q 39/04* (2006.01)
*B23Q 7/04* (2006.01)
(Continued)

(52) U.S. Cl.
CPC ............. *B23Q 39/046* (2013.01); *B23Q 7/04* (2013.01); *B23Q 7/1405* (2013.01); *B23Q 7/165* (2013.01);
(Continued)

(58) Field of Classification Search
CPC ............... Y10T 29/519; Y10T 29/5125; Y10T 29/5127; Y10T 29/5128; Y10T 29/5129;
(Continued)

(56) References Cited

U.S. PATENT DOCUMENTS

| 2,942,527 A | * | 6/1960 | Bowen | B23Q 3/06 198/403 |
| 4,614,018 A | * | 9/1986 | Krall | B23Q 7/005 264/536 |

(Continued)

FOREIGN PATENT DOCUMENTS

| DE | 10 2007 016 270 B4 | 8/2009 | | |
| FR | 2773092 A1 | * 7/1999 | ............ | B23P 21/004 |
| JP | 10043907 A | * 2/1998 | ........... | B23Q 39/046 |

*Primary Examiner* — Erica E Cadugan
*Assistant Examiner* — Michael Vitale
(74) *Attorney, Agent, or Firm* — R. S. Lombard

(57) ABSTRACT

The invention relates to a machine tool as well as to a method for operating the machine tool. The machine tool comprises a workpiece carrier (20) that can be incrementally rotated about an incremental advance axis (22) and has several carrier sides (25). A first workpiece chuck unit (26) for holding a workpiece in a first position (P1) and a second workpiece chuck unit (27) for holding a workpiece in a second position (P2) are arranged on each carrier side (25). In each angular position or incremental advance position of the workpiece carrier (20), one carrier side (25) is in a loading station (30), one carrier side (25) is in an unloading station 31, and the respectively other carrier sides (25) are in respectively one work station (32). A workpiece changing device (34) is provided, said device moving a partially machined workpiece (16*a*) out of the first position (P1) in the unloading station (31) into the second position (P2) in the loading station. The position change of the partially machined workpiece (16*a*) preferably also takes place during the incremental advance movement of the workpiece carrier (20). Preferably, the partially machined workpiece (16*a*) can be turned in doing so.

11 Claims, 6 Drawing Sheets

(51) Int. Cl.
*B23Q 7/18* (2006.01)
*B23Q 11/00* (2006.01)
*B23Q 17/00* (2006.01)
*B23Q 7/14* (2006.01)
*B23Q 7/16* (2006.01)
B23P 21/00 (2006.01)
B23Q 39/00 (2006.01)

(52) U.S. Cl.
CPC ........ *B23Q 11/0042* (2013.01); *B23Q 39/044* (2013.01); *B23P 21/006* (2013.01); *B23Q 11/0053* (2013.01); *B23Q 17/00* (2013.01); *B23Q 2039/006* (2013.01); *Y02P 70/171* (2015.11); *Y10T 29/49998* (2015.01); *Y10T 29/513* (2015.01); *Y10T 29/519* (2015.01); *Y10T 29/5124* (2015.01); *Y10T 29/5127* (2015.01); *Y10T 29/5128* (2015.01); *Y10T 29/5129* (2015.01)

(58) Field of Classification Search
CPC ..... Y10T 29/513; Y10T 29/5124; B23Q 7/04; B23Q 7/1405; B23Q 39/04; B23Q 39/042; B23Q 39/044; B23Q 39/046; B23P 13/00; B23P 21/006; B65G 47/248
USPC ........ 29/33 J, 37 R, 38 A, 38 B, 38 C, 38 R, 29/563
See application file for complete search history.

(56) References Cited

U.S. PATENT DOCUMENTS

| | | | | |
|---|---|---|---|---|
| 6,435,397 | B2* | 8/2002 | Angel | B23K 37/0461 228/4.1 |
| 2011/0000063 | A1* | 1/2011 | Sueoka | B23P 21/006 29/33 P |
| 2013/0074317 | A1* | 3/2013 | Weber | B23P 21/006 29/559 |

* cited by examiner

MACHINE TOOL

CROSS-REFERENCE TO RELATED APPLICATION

This application claims the priority benefits of German Application No. 10 2014 106 915.3 filed May 16, 2014, which application is incorporated herein by reference as though fully set forth.

BACKGROUND OF THE INVENTION

The present invention relates to a machine tool that can also be referred to as a rotary indexing machine tool. The machine tool comprises several work stations. A workpiece carrier holds, distributed around its circumference, several workpiece chuck units, each being able to hold one workpiece. The respectively affected workpiece can be machined from one or several sides in the work stations. The workpiece carrier with the workpiece chuck units is advanced in increments, so that the workpieces pass through several work stations until, finally, they have been completely machined.

Such a machine tool is known from publication DE 10 2007 016 270 B4, for example. There, the workpieces are machined from three sides in each work station. To accomplish this, the machine frame of each work station has machining units arranged above, below and next to the work area.

This machining of a workpiece from three sides or on three sides is frequently necessary in order to achieve a prespecified, fully finished shape of the workpiece. However, the machining units arranged below the work area create problems because many shavings may accumulate there during cutting operations and impair the proper function of the lower machining unit. This is the case, in particular, when the materials of machined workpieces produce long shavings or when no coolant is used during dry machining.

Therefore, the object of the present invention may be viewed as the provision of a machine tool, in particular a rotary indexing machine tool, that makes possible an improved shavings removal.

SUMMARY OF THE INVENTION

This object is achieved by the machine tooland by the method for operating the machine tool exhibiting the features of the claims.

The machine tool comprises a workpiece carrier that is rotatably supported by a machine frame and that can be rotated further step by step by an indexing drive by an increment angle between successive angular position. The workpiece carrier has several carrier sides. The number of carrier sides preferably corresponds to the number of possible angular positions of the workpiece carrier. Arranged on each carrier side there are a first workpiece chuck unit and a second workpiece chuck unit, in which case, on each carrier side, the first workpiece chuck unit holds a workpiece in a first position and the second workpiece chuck unit holds a workpiece in a second position. The second position preferably follows the first position in the direction of rotation of the workpiece carrier.

Furthermore, the machine tool comprises a loading station, an unloading station and work stations arranged between the loading station and the unloading station, viewed in the direction of rotation of the workpiece carrier. The number of work station depends on the size of the machine tool. A preferred exemplary embodiment may comprise three to six work stations. Larger machine tools may also be equipped with more than six work stations. Each work station comprises a machining unit and/or a measuring unit and/or a verification unit.

During a dwell phase, during which the workpiece carrier is at rest, a workpiece blank is inserted preferably in the first workpiece chuck unit in the loading station, said workpiece chuck unit being in the current angular position in the loading station. Furthermore, a finished, machined workpiece is preferably removed from the second workpiece chuck unit that is positioned in the current angular position in the unloading station. For insertion and removal of the respective workpiece, appropriate devices, for example, gripper devices or another suitable loading device or unloading device may be provided.

Referring to the machine tool, a workpiece moves twice through each work station until the workpiece has been machined several times in the machine tool—beginning at a starting position (workpiece blank)—and is finally removed as a finished, machined workpiece.

The machine tool comprises a work piece changing device. It is disposed to perform—preferably at least also during one incremental advance movement of the workpiece carrier—one position change of the partially machined workpiece located in the unloading station. During this position change, the partially machined workpiece remains on the same carrier side of the workpiece carrier but changes its workpiece position from the first position into the second position, or vice versa. Preferably, this workpiece position change can be performed in the two ways described hereinafter:

On each carrier side, the workpiece changing device comprises a rotatable carrier on which the two workpiece chuck devices are arranged. The carrier can be rotated about an axis of rotation at a right angle relative to the incremental advance axis. The carrier that is located in the unloading station is rotated during the subsequent incremental advance movement of the workpiece carrier by 180° so that the workpiece that has until now been in the first position is moved into the second position, and/or vice versa. During this position change, the partially machined workpiece is preferably also turned so that its side that has faced downward until now will now face upward, and vice versa. In doing so, the workpiece remains in its chuck despite its position change, this increasing precision.

During the dwell phase of the workpiece carrier, the partially machined workpiece is removed by the workpiece changing device from the one—preferably the first—workpiece chuck unit in the unloading station and transported during the next incremental advance movement of the workpiece carrier into the loading station. During the subsequent dwell phase, the partially machined workpiece is inserted into the respectively other—preferably the second—workpiece chuck unit that is currently located in the loading station. The partially machined workpiece can be turned over during the transport movement from the unloading station into the loading station so that its formerly upward facing side now faces downward, and vice versa.

In the two embodiments described hereinabove, the position change of the partially machined workpiece occurs at least also during the incremental advance rotation of the workpiece carrier and can be started during the previous dwell phase and completed during the subsequent dwell phase. In any event, as a result of this, no additional machine tool work cycle is required As has been explained, the partially machined workpiece is preferably turned during the transport from the unloading station to the loading station. After the position change, the lower side of the partially machined workpiece facing vertically downward now faces vertically upward, and vice versa, in the loading station. Consequently, there is a rotational movement or a swiveling movement by approximately 180° about a horizontal axis.

At least one machining unit for machining at least one of the two workpieces is positioned in the work stations. When the machine tool is completely loaded with machining units and/or measuring units and/or verification units, each work station is preferably assigned a maximum of four units. Each of these units is arranged either laterally relative to one workpiece chuck unit or above the associate workpiece chuck unit. Each workpiece can be machined, checked or measured from two sides, i.e., from the top or radially from the outside, relative to the incremental advance axis of the workpiece carrier. Workpieces such as T-fittings can be machined, checked or measured from a total of three sides in two passes through the work stations. The machine tool can be equipped for performing a method for machining T-fittings.

In particular, there are no machining units and/or measuring units and/or verification units located below a work area of each work station. Therefore, the machine tool ensures an optimal removal of shavings.

Although each workpiece passes twice through each station, the output of the machine tool is not reduced because there are always two workpiece chuck units per station. During each cycle of the machine tool, a completely finished workpiece can be removed at the unloading station. It is only during the first startup that a certain time is required once until the completely finished workpiece can be removed. Subsequently, the machine tool produces a completely finished workpiece during each cycle.

It is advantageous if the workpiece carrier can be stationarily locked in each angular position—in particular relative to a machine frame—in order to maintain the exact positioning of the workpiece carrier while the workpieces are being machined.

The carrier sides that are directly adjoining in circumferential position about the incremental advance axis are inclined relative to each other. The directions of the normals of these carrier sides subtend an angle that corresponds to the increment angle of the machine tool.

As explained hereinabove, it is preferably possible to turn the partially machined workpiece during its transport to the loading station. This turning may thus be performed by the workpiece changing device. As an alternative, it is also possible for the workpiece chuck units to be configured or arranged so as to be rotatable about a horizontal axis and to turn the workpiece by means of the workpiece chuck unit.

Preferably, the workpiece changing device comprises a swivel gripper or represents a swivel gripper that, in particular, has two gripper hands. The gripper hands of the swivel gripper are arranged so as to be pivotable about a horizontal swivel axis and are preferably arranged diametrically opposite this swivel axis. Preferably, the swivel axis extends radially with respect to the incremental advance axis and, in particular, in the center between the unloading station and the loading station. Due to this swivel movement, it is possible to turn the workpiece at the same time. To be able to insert the workpiece into the tool chuck unit and/or to remove the workpiece from said tool chuck unit, the respective gripper hand can preferably be moved in the direction of the normal relative to the carrier side in the loading station or unloading station.

In a preferred embodiment of the machine tool the machine frame comprises a head plate and a base plate. In conjunction with this, the workpiece carrier is arranged between the head plate and the base plate. In a work station, the head plate and the base plate, as well as the carrier side with the workpiece chuck units, delimit the work area of a work station. Radially at a distance from said carrier sides, the head plate may be connected to the base plate via connecting elements. These connecting elements may be configured as struts or bearers and/or as plates. Radially outside, the machine tool may have, on at least the loading station and the unloading station, openings for the removal and supply of workpieces. A connecting element may be used to lock the work area in the work stations. In particular, the base plate of the machine frame does not comprise machining units. For example, the base plate may be inclined toward an opening of a discharge duct for shavings and/or coolant.

BRIEF DESCRIPTION OF THE DRAWINGS

Advantageous embodiments of the machine tool and of the method for operating the machine tool can be inferred from the dependent claims, the description and the drawings. Hereinafter, preferred exemplary embodiments of the machine tool and the method will be explained in detail with reference to the appended drawings. They show in FIG. 1 a schematic drawing, similar to a block circuit diagram, of an exemplary embodiment of a machine tool, in plan view;

DETAILED DESCRIPTION OF THE PARTICULAR EMBODIMENTS

Figure 1:
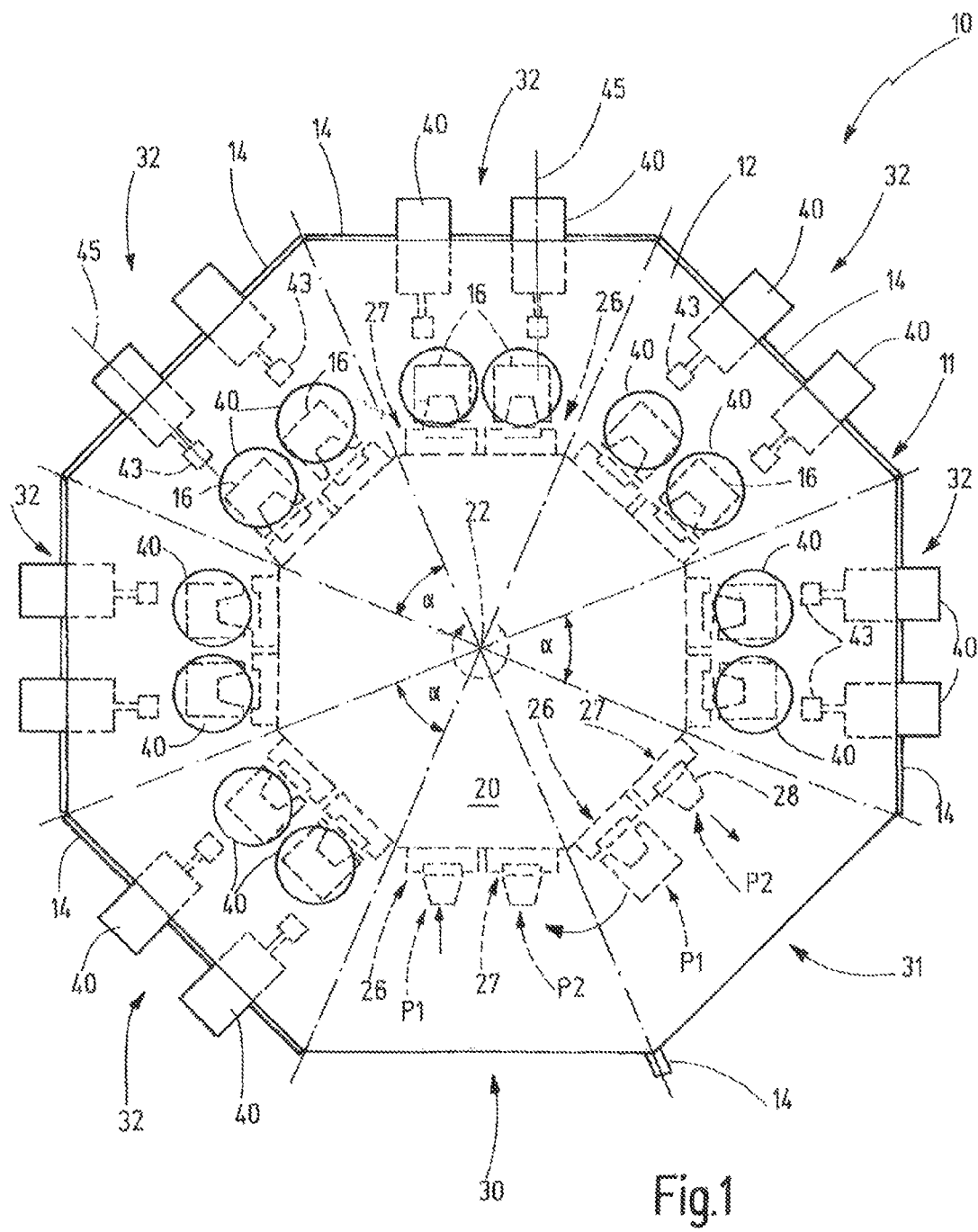

FIG. 1 is a schematic illustration of an exemplary embodiment of a machine tool in plan view. The machine tool 10 comprises a machine frame 11 that, in the exemplary embodiment, comprises a head plate 12, a base plate 13 (FIGS. 3 and 4) arranged at a distance from the head plate, as well as several connecting elements 14, wherein the connecting elements 14 connect the head plate 12 to the base plate 13 in order to achieve the mechanical stability of the machine frame 11. The connecting elements 14 may be configured as plate-shaped elements and/or as struts or bearers. The plate-shaped connecting elements are used mainly wherever a work area 15 is to be closed toward the outside in order to be able to perform cutting work on workpieces 16 that are held between the head plate 12 and the base plate 13.

Figure 2:
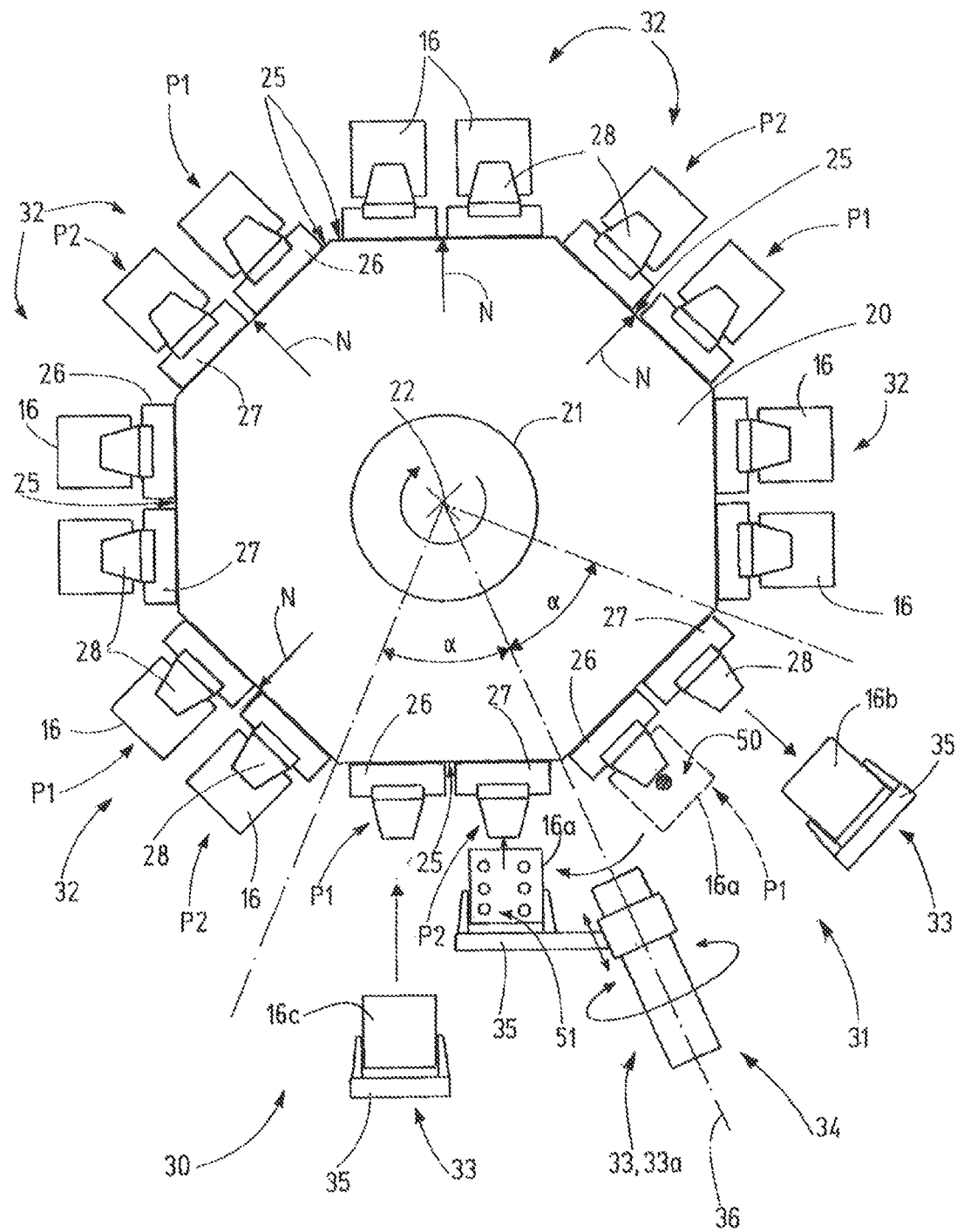
FIG. 2 a schematic drawing, similar to a block circuit diagram, of the workpiece carrier of the machine tool of FIG. 1, in plan view.

The machine tool 10 comprises a workpiece carrier 20 that is shown schematically by itself in FIG. 2. With the use of an incremental advance drive 21 (FIG. 2), the workpiece carrier 21 is supported on the machine frame 11 so as to be rotatable in one direction of rotation—either clockwise or counterclockwise—about an incremental advance axis 22. The incremental advance axis 22 extends in vertical direction in the exemplary embodiment described here. The incremental drive 21 is disposed to rotate the workpiece carrier 20 between respectively successive angular positions about a respective increment angle α and to hold it in the respective angular position during a dwell phase, upon the completion of this rotational movement. To accomplish this, the incremental drive may comprise locking means in order to fix the position of the workpiece carrier 20 in a respective angular position. The increment angle α between respectively adjacent angular positions of the workpiece carrier 20 is the same.

The workpiece carrier 20 comprises several carrier sides 25. In accordance with the example, the number of carrier sides 25 corresponds to the number of possible angular positions of the workpiece carrier. Considering the exemplary embodiment shown here, the workpiece carrier 20 has eight carrier sides 25. However, there may also be fewer or more carrier sides 25, for example, between five and twelve carrier sides. This depends on the size of the machine tool and the complexity or number of process steps required for machining and/or measuring or verification, and/or for the measuring units and/or verification units of the workpieces 16.

A first workpiece chuck unit 26, as well as a second workpiece chuck unit 27, are arranged on each carrier side 25. The two workpiece chuck units 26, 27 are preferably arranged horizontally next to each other and are identical in the exemplary embodiment described here. In accordance with the example, each workpiece chuck unit 26, 27 has at least two clamping jaws 28, which can be moved relative toward each other and between which a workpiece 16 can be clamped or held in place. The manner in which the workpiece 16 is held by a workpiece chuck unit 26, 27, but can be varied in many ways. For example, if the workpieces are at least partially cylindrical it is possible to use a clamping chuck.

The first workpiece chuck unit 26 holds a workpiece in a first position P1, and the second workpiece chuck unit 27 holds a workpiece 16 in a second position P2 which, in the preferred exemplary embodiment, is located after the first position P1 in the direction of rotation of the workpiece carrier 20. Alternatively, it is also possible to provide another relative location of the two positions P1, P2 relative to the common carrier side 25.

The machine tool 10 comprises several stations corresponding to the number of carrier sides 25 or angular positions. A loading station 30, an unloading station 31 and several work stations 32 are located in the direction of rotation of the workpiece carrier 20 between the loading station 30 and the unloading station 31. Preferably, the unloading station 31 is arranged—in the direction of rotation of the workpiece carrier 20—directly ahead of the loading station 30, so that the workpiece chuck units 26, 27 that are in one angular position in the unloading station 31 will be located in the loading station 30 after the next rotation of the workpiece carrier 20 by the increment angle α. In the preferred exemplary embodiment described here, there are six work stations 32.

As illustrated by FIGS. 1 and 2, a workpiece blank 16*c*, which has not yet been machined by the machine tool and thus is in an original state, is transported to one of the two workpiece chuck devices 26, 27 and, in accordance with the example, to a first workpiece chuck unit 26, and held clamped there in a prespecified position with the aid of clamping jaws 28. A gripper unit 33 may be provided for said transport.

In the unloading station 31, a completely finished workpiece 16*b* is removed from one of the two workpiece chuck units 26, 27 and in accordance with the example, from the second workpiece chuck unit 27; this may also be accomplished with the use of a gripper unit 33.

In the exemplary embodiment as in FIGS. 1 and 2, the unloading station 31 and the loading station 30 are furthermore associated with a workpiece changing device 34. In accordance with the example, the workpiece changing device 34 is also a gripper unit 33 that may be configured as 33*a*. The swivel gripper 33*a* has two gripper hands 35 with which a workpiece 16 can be gripped and held, for example by means of adjustable gripper jaws or the like. The two gripper hands 35 are arranged diametrically opposite each other relative to a swivel axis 36. The gripper hands 35 of the swivel gripper 33*a* can be moved in the direction of normal N of the carrier side 25 that is located in the current angular position of the tool carrier 20 in the unloading station 31 or the loading station 30.

Furthermore, the gripper hands 35 can be swiveled about the swivel axis 36 so that each gripper hand 35 can be moved between the unloading station 31 and the loading station 30. The swivel axis 36 extends—according to the example, centrally between—between the unloading station 31 and the loading station 30. Preferably, the swivel axis 36 extends at a right angle to the incremental advance axis 22. In the exemplary embodiment, the swivel axis 36 intersects the incremental advance axis 22.

At least one machining unit 40 and/or measuring unit and/or verification unit is provided in each work station 32. In accordance with the example, each work station 32 can be equipped with up to four such units, for example, machining units 40. Consequently each workpiece chuck unit 26, 27 in a work station 32 can be associated with one or two units for machining and/or verification and/or measurement of the respectively mounted workpiece 16. In the exemplary embodiments illustrated here, only the machining units 40 are shown, in which case—at each location—it is possible that, at least in part, there may also be a measuring unit or a verification unit. Hereinafter, only the machining units 40 are mentioned as examples.

Figure 3:
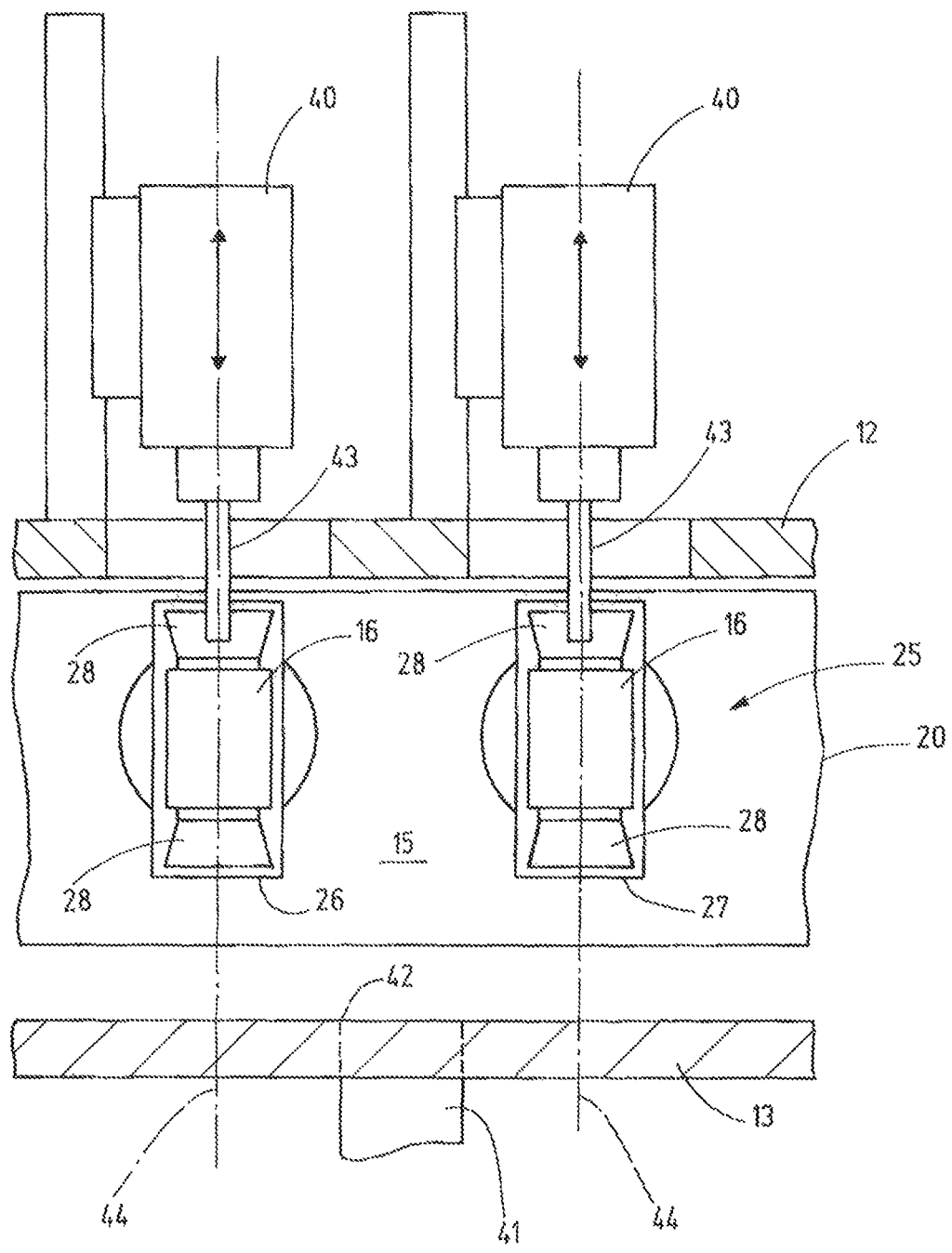
FIG. 3 a schematic side view, similar to a block circuit diagram, of a carrier side of the workpiece carrier of FIG. 1, in a work station.
Figure 4:
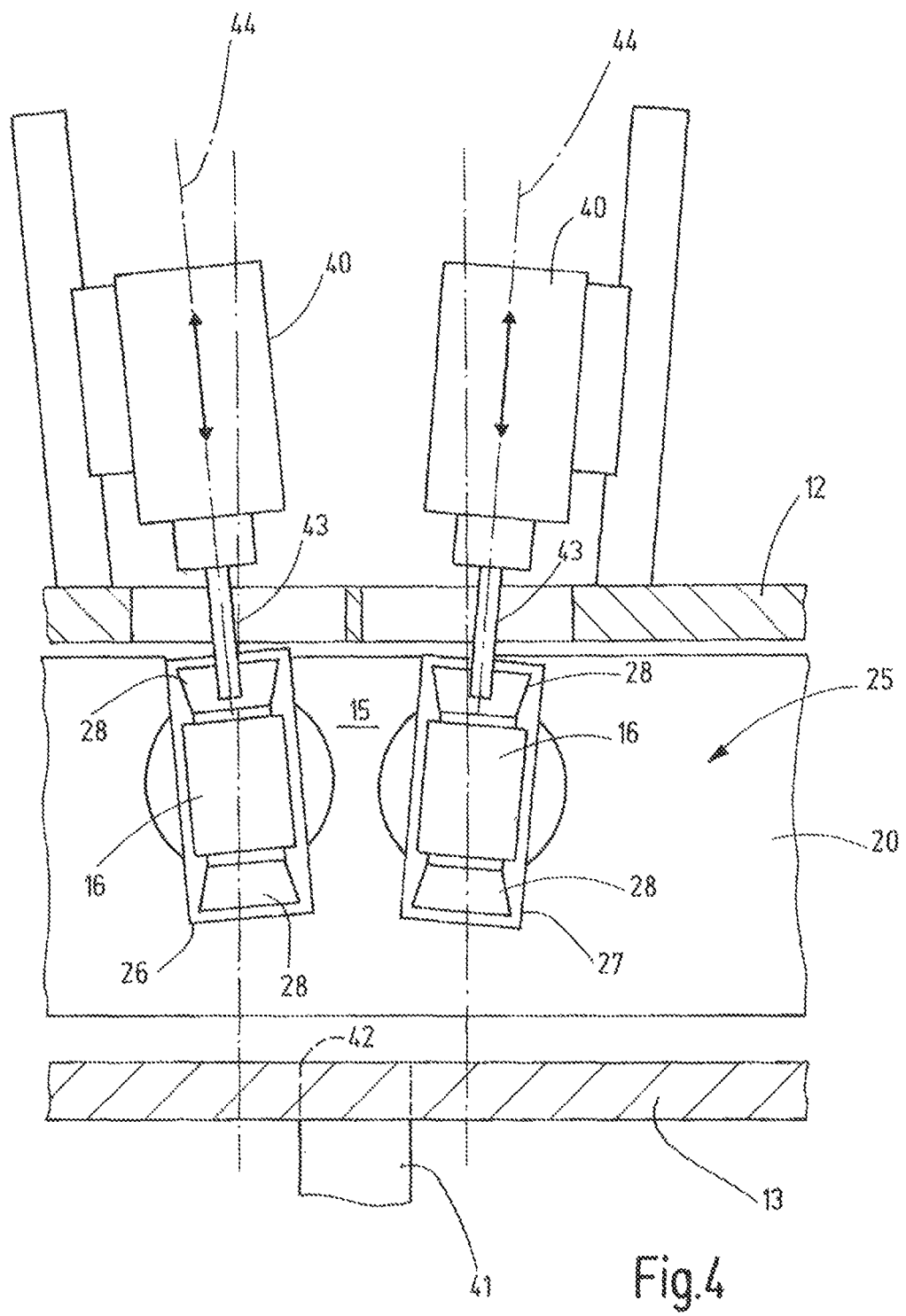
FIG. 4 a schematic side view, similar to a block circuit diagram, of a carrier side of the workpiece carrier, with a modified arrangement of the machining units on a head plate of the machine frame.

The machining units 40 are arranged either in the head plate 12 of the machine frame 11 or farther outside viewed in radial direction toward the incremental advance axis 22, laterally to the respectively associate workpiece chuck unit 26, 27. For example, the machining units 40 may also be arranged in or on one or several connecting elements 14. The machining units 40 are thus located—viewed in vertical direction—above or laterally next to an associate workpiece chuck unit 26, 27. No machining units 40 are provided below the workpiece chuck units 26, 27. The base plate 13 of the machine frame 11 is thus free of machining units 40. As a result of this the removal of shavings falling onto the base plate 13 during cutting operations on the workpieces 16 in the work stations 32 can be optimized. Each of FIGS. 3 and 4 shows, schematically, a discharge duct 41 which terminates in an opening 42 in the base plate 13 and by way of which the shavings, and optionally coolant, can be carried away from the machine tool 10.

Each of the machining units 40 is disposed for machining a respectively allocated workpiece 16. To accomplish this, the machining units comprise one machining tool 43 each. A machining tool 43 may be a drilling tool, a milling tool, a grinding tool or another desired machining tool, in particular for the cutting-type machining of the workpiece 16. For machining the workpiece 16, the machining units 40 or the machining tool 43 can be moved toward the workpiece 16 and away from said workpiece. To accomplish this, the machining units 40 that are arranged on the head plate 12 above the workpiece chuck units 26, 27 can be moved along a first supply axis 44 that is preferably parallel to the incremental advance axis 22. Alternatively, for optimizing the design space, it is also possible to incline the first supply axis 44 relative to a vertical axis so that the machining units 40 arranged at a work station 32 on the head plate 12 may be arranged more closely next to each other (FIG. 4). The not illustrated second supply axes for the machining units 40 that are arranged laterally next to the workpiece chuck units 26, 27 extend preferably in an essentially horizontal direction.

If necessary, the machining units 40 can also be moved in one plane that extends at a right angle to the respective supply axis 44, 45. Verification or measuring units comprise, instead of the machining tool 43, a verification or measuring tool, however, they may be appropriately deliverable and movable.

Viewed in the direction of the incremental advance axis 22, the workpiece carrier 20 is arranged between the head plate 12 and the base plate 13. Consequently, in a work station 32, the work area 15 of this work station is delimited by the carrier side 25, the head plate 12, the base plate 13 and, optionally, by at least one connecting element 14.

The machine tool 10 operated as hereinabove is equipped to perform the following method. To accomplish this, an appropriate, not illustrated, machine control unit may be provided.

During the startup of the machine tool 10, all workpiece chuck units 26, 27 are initially not loaded. At the start, a workpiece blank 16c is set in a starting position into the first tool chuck unit 26 in the loading station 30. In this starting state, the workpiece blank 16c has not been machined yet by this machine tool 10. The workpiece carrier 20 is sequentially incrementally rotated about the incremental advance axis 22. In accordance with the example, after the workpiece carrier 20 has performed seven incremental movements, a partially machined workpiece 16a is positioned in the first workpiece chuck unit 26 in the unloading station 31. The second workpiece chuck units 27 are still empty.

With the help of the workpiece changing device 34 configured as a swivel gripper 33a in the exemplary embodiment as in FIG. 2, the partially machined workpiece 16a is removed from the first position P1 in the first workpiece chuck unit 26 of the unloading station 31. During the next incremental advance movement of the workpiece carrier 20 about the incremental advance axis 22, the partially machined workpiece 16a is transported out of the unloading station 31 into the loading station 30. In accordance with the example, the partially machined workpiece 16a is turned in such a manner that its upper side 50 facing upward toward the head plate 12 in the unloading station 31 now faces downward toward the base plate 13 in the loading station 30 when inserted into the second workpiece chuck unit 27. Accordingly, the underside 51 of the partially machined workpiece 16a, said underside facing in the first workpiece chuck unit 26 of the partially machined workpiece 16a downward toward the base plate 13, faces upward toward the head plate 12 after having been turned and before being inserted into the second workpiece chuck unit 27 in the loading station. FIG. 2 schematically illustrates the turning of the partially machined workpiece 16a by means of the dots on a playing dice. The side of the dice having a single dot represents the upper side 50 and the oppositely oriented side having six dots represents the underside 51. The orientation of the partially machined workpiece 16a before and after being turned is illustrated schematically.

The partially machined workpieces 16a are moved from the first position P1 on one carrier side 25 into the second position on the same carrier side 25 by means of the workpiece changing device 34.

Step by step the respectively second workpiece chuck units 27 are loaded with a partially machined workpiece 16a in the loading station 30. After the startup phase of the machine tool 10, one workpiece is present in respectively each workpiece chuck unit 26, 27 in the work stations 32.

After the completion of this startup phase a finished machined workpiece 16b as well as a partially machined workpiece 16a are removed during each dwell phase of the workpiece carrier 20 in the unloading station 31, and a workpiece blank 16c as well as a partially machined workpiece 16a are supplied to the loading station 30. The swivel gripper 33a having the two gripper hands 35 and acting as the workpiece changing device 34 is swiveled during the incremental advance movement of the workpiece carrier 20 about its swivel axis 36, so that a partially machined workpiece 16a is removed from a first workpiece chuck device 26 and inserted in a second workpiece chuck device 27 during each dwell phase, and that thus the position change of the partially machined workpiece 16a can be performed.

In the exemplary embodiment of the machine tool 10 shown here, all receptacle spaces for arranging a machining unit 40 and/or measuring unit and/or verification unit in each work station 32 are occupied. In modification thereof, these receptacle spaces may be occupied only partially by a respective unit. The arrangement and the number of units depends on how and in what sequence a workpiece 16 is machined, tested or measured.

Each tool 16 thus moves twice through each work station 32. During the first pass, the workpiece 16 is in the first position P1 in a first workpiece chuck unit 26 and during the subsequent second pass it is in the second position P2 in a workpiece chuck unit 27. Consequently, in accordance with the example, each workpiece 16 can be machined, tested and/or measured in up to twelve successive work steps in the work stations 32. The number of maximum work steps corresponds to twice the number of existing work stations 32. As a result of the fact that the partially machined workpiece 16a is turned after its first pass and before its second pass, it is possible to machine the upper side 50, as well as the underside 51, by the machining units 40 arranged in the head plate 12, or to have them measured by a measuring unit or checked by a verification unit. The arrangement of machining units and/or measuring units and/or verification units in the base plate is thus not intended.

Figure 5:
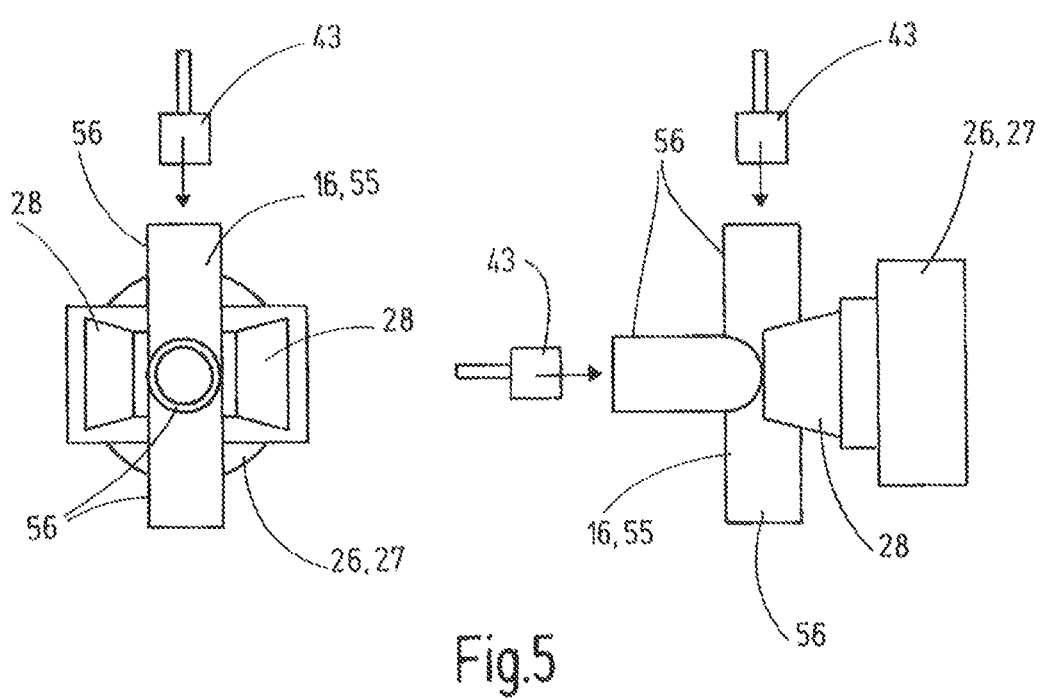
FIG. 5 a schematic drawing of a workpiece chuck unit with a workpiece represented by a T-fitting.

With the use of this method or of this machine tool, it is possible to machine and/or measure and/or check T-fittings 55 with three pipe sections 56 oriented at right angles relative to each other from three sides, for example (FIG. 5).

Figure 6:
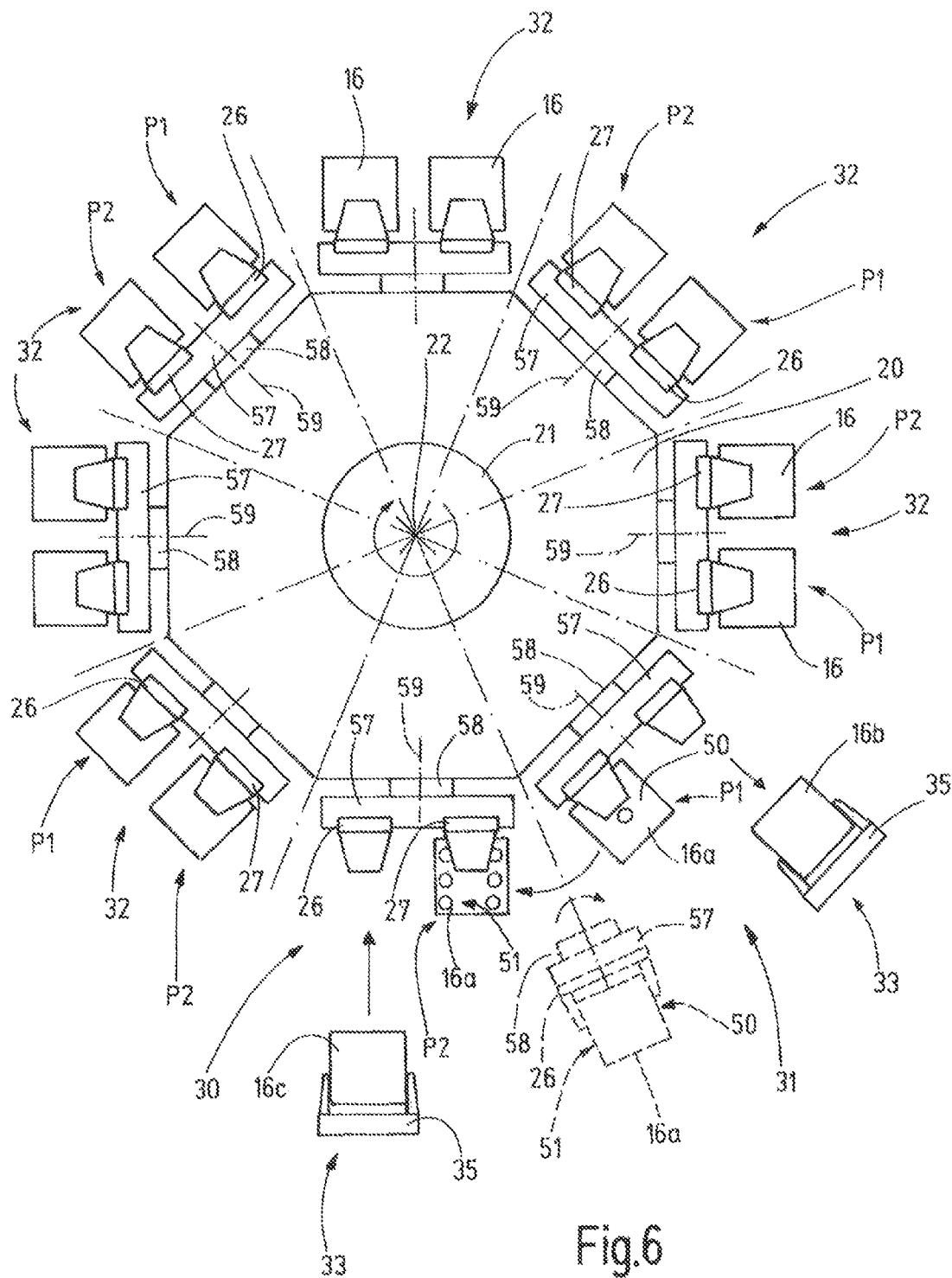
FIG. 6 a schematic drawing, similar to a block circuit diagram, of the workpiece carrier of the machine tool of FIG. 1 in a plan view, wherein the embodiment of a workpiece changing device has been modified compared with FIGS. 1 and 2.

FIG. 6 shows another exemplary embodiment of the workpiece changing device 34 for the machine tool 10. The workpiece changing device 34 comprises, on each carrier side 25, a carrier 57 that—by means of a rotary drive 58—can be rotated about a rotational axis 59 between two rotational positions. The rotational axis 59 is oriented at a right angle with respect to the incremental advance axis, intersecting it in the exemplary embodiment. The rotatability of the carrier 57 is at least 180° but may also be 360°. This is a function of the configuration of the rotary drive 58. The rotary drive 58 can therefore drive the carrier in one direction by 180° or between the two rotational positions in one or the opposite direction of rotation.

During the subsequent incremental advance movement, the carrier 57 that is currently in the unloading station 31 is rotated by 180° about its rotational axis 59 into its respectively other rotational position. The partially machined workpiece 16a that has so far been in the first position P1 is moved into the second position 22. During this position change, the partially machined workpiece 16a is turned so that its until now downward facing underside 51 now faces upward, and vice versa.

The method for machining the workpieces 16 or the T-fittings 55 corresponds to the method as has been explained in conjunction with FIGS. 1 and 2, so that reference is made to the explanations hereinabove.

The invention relates to a machine tool 10 as well as to a method for operating the machine tool 10 or for machining workpieces 16. The machine tool 10 comprises a workpiece carrier 20 that can be incrementally rotated about an incremental advance axis 22 and has several carrier sides 25. A first workpiece chuck unit 26 and a second workpiece chuck unit 27 are arranged on each carrier side 25. The first workpiece chuck unit 26 holds the workpiece in a first position P1, and the other workpiece chuck unit 27 holds it in a second position P2 on the carrier side 25. In each angular position or incremental advance position of the workpiece carrier 20, one carrier side 25 is in a loading station 30, one carrier side 25 is in an unloading station 31, and the respectively other carrier sides 25 are in respectively one work station 32. A workpiece changing device 34 is provided, said device moving a partially machined workpiece 16a out of the first position P1 located in the unloading station 31 and into a second position P2. This position change is completed at the latest while the carrier side 25, after one incremental advance movement from the unloading station 31 into the subsequent loading station 30. Preferably, the partially machined workpiece 16a is turned during the position change or during the transport from the unloading station 31 to the loading station 30.

LIST OF REFERENCE SIGNS

10 WerkzeMachine tool
11 Machine frame
12 Head plate
13 Base plate
14 Connecting element
15 Work area
16 Workpiece
20 Workpiece carrier
21 Indexing drive
22 Incremental advance axis
25 Carrier side
26 First workpiece chuck unit
27 Second workpiece chuck unit
28 Clamping jaw
30 Loading station
31 Unloading station
32 Work station
33 Gripper unit
33a Swivel gripper
34 Workpiece changing device
35 Gripper hand
36 Swivel axis
40 Machining unit
41 Discharge duct
43 Opening
Machining tool
44 First supply axis
45 Second supply axis
50 Upper side
51 Underside
55 T-Fitting
56 Pipe section
57 Carrier
58 Rotary drive
59 Rotational axis
α Increment angle
N Direction of the normal
P1 First position
P2 Second position

What is claimed is:

1. A machine tool (10), comprising:
a workpiece carrier (20) that is supported so as to be rotatable about a vertical axis (22), wherein the workpiece carrier (20) can be incrementally rotated forward by an indexing drive (21) in steps by respectively one increment angle (α) between successive angular positions,
the workpiece carrier (20) having a plurality of carrier sides (25), each of the plurality of carrier sides (25) having a respective first workpiece chuck unit (26) and a respective second workpiece chuck unit (27);
a loading station (30) for insertion of a workpiece into a given one of the first workpiece chuck units (26) when the given one of the first workpiece chucks units (26) has been rotated forward into an angular position in the loading station (30);
a workpiece changing device (34) that transfers the workpiece after partial processing thereof from the given one of the first workpiece chucks units (26), when the given one of the first workpiece chucks units (26) has been rotated forward into an angular position in an unloading station (31), and into one of the second workpiece chucks units (27), wherein the one of the second workpiece chucks units (27) is disposed on the carrier side (25) that is located in the next successive angular position in the loading station (30);
the unloading station (31), for removing the workpiece from the one of the second workpiece chuck units (27) when all workpiece processing steps have been completed and the one of the second workpiece chucks units (27) is located in the angular position in the unloading station (31);
a plurality of work stations (32) disposed between the loading station (30) and the unloading station (31), each of the plurality of work stations (32) being associated with at least one machining unit (40) and/or measuring unit and/or verification unit for processing the workpiece, wherein each of the at least one machining units (40) is arranged laterally and/or above the respective first workpiece chuck units (26) and the respective second workpiece chuck units (27) of the carrier sides (25) when the carrier sides (25) are located in the associated work stations (32) of each of the at least one machining units (40); and in transferring the workpiece after partial processing thereof from the given one of the first workpiece chucks units (26) and into the one of the second workpiece chucks units (27), the workpiece changing device (34) rotates or swivels the workpiece in such a manner that an uppermost face of the workpiece, when the workpiece is mounted within the given one of the first workpiece chuck units (26), is turned downward when the workpiece is received within the one of the second workpiece chucks units (27).

2. The machine tool (10) tool as in claim 1, wherein directions of normal vectors (N) extending from adjoining carrier sides (25) are inclined relative to each other by an angle that corresponds to the increment angle (α).

3. The machine tool (10) tool as in claim 1, wherein each of the plurality of work stations (32) comprises a maximum of four receptacle sites for respectively one machining unit (40) and/or measuring unit and/or verification unit.

4. The machine tool (10) tool as in claim 1, wherein the workpiece changing device (34) is disposed to remove the workpiece after partial processing thereof from the given one of first workpiece chuck units (26) when the given one of the first workpiece chucks units (26) has been rotated forward into the angular position in the unloading station (31), while a second finished, machined workpiece is removed from the second workpiece chuck unit (27), which is disposed on the same carrier side as the given one of the first workpiece chucks units (26).

5. The machine tool (10) tool as in claim 1, wherein the workpiece changing device (34) is disposed to insert the workpiece after partial processing thereof during the preceding dwell phase of the workpiece carrier (20), into the one of the second workpiece chuck units (27) located in the loading station (30), while a second workpiece is inserted in the first workpiece chuck unit (26), which is disposed on the same carrier side as the one of the second workpiece chucks units (27).

6. The machine tool (10) tool as in claim 1, wherein the workpiece changing device (34) comprises a swivel gripper (33*a*) having at least one gripper hand (35), which can be swiveled about a swivel axis (36) that extends between the unloading station (31) and the loading station (30).

7. The machine tool (10) tool as in claim 1, wherein the machine tool (10) further comprises a machine frame (11) having a head plate (12) and a base plate (13), and the workpiece carrier (20) is arranged between the head plate (12) and the base plate (13) so as to be rotatable on the machine frame (11).

8. The machine tool (10) tool as in claim 7, wherein the head plate (12) and the base plate (13) are connected to each other via connecting elements (14) that are disposed radially outward with respect to the vertical axis (22).

9. The machine tool (10) tool as in claim 7, wherein receptacle spaces for respectively receiving the at least one machining unit (40) and/or measuring unit and/or verification unit of a given work station (32) are arranged on the head plate (12) and/or on one or more connecting elements (14).

10. The machine tool (10) tool as in claim 7, wherein the base plate (13) is free of receptacle spaces for receiving respective machining units (40) and/or measuring units and/or verification units.

11. The machine tool (10) tool as in claim 7, wherein a discharge duct (41) for shavings and/or coolant is provided in and/or on the base plate (13).

* * * * *